US011288299B2

(12) United States Patent
Chen et al.

(10) Patent No.: US 11,288,299 B2
(45) Date of Patent: Mar. 29, 2022

(54) ENHANCED ACTION FULFILLMENT USING CLASSIFICATION VALENCY

(71) Applicant: International Business Machines Corporation, Armonk, NY (US)

(72) Inventors: Dennis Jinlone Chen, Wellesley, MA (US); Jonathan Dunne, Dungarvan (IE); Vijay Francis, Nashua, NH (US); Andrew T. Penrose, Castleknock (IE); Rogelio Vazquez-Rivera, Acton, MA (US)

(73) Assignee: International Business Machines Corporation, Armonk, NY (US)

( * ) Notice: Subject to any disclaimer, the term of this patent is extended or adjusted under 35 U.S.C. 154(b) by 242 days.

(21) Appl. No.: 15/960,921

(22) Filed: Apr. 24, 2018

(65) Prior Publication Data

US 2019/0325065 A1    Oct. 24, 2019

(51) Int. Cl.
*G06F 16/35*    (2019.01)
*G06N 5/04*    (2006.01)
(Continued)

(52) U.S. Cl.
CPC ............ *G06F 16/353* (2019.01); *G06N 5/04* (2013.01); *H04W 4/12* (2013.01); *G06N 20/00* (2019.01); *H04L 67/12* (2013.01); *H04L 67/306* (2013.01)

(58) Field of Classification Search
CPC .......... G06F 16/353; G06F 9/00; H04W 4/12; G06N 5/04; G06N 20/00; H04L 67/12; H04L 67/306; H04L 51/00; H04L 51/04
See application file for complete search history.

(56) References Cited

U.S. PATENT DOCUMENTS 6,424,960 B1    7/2002  Lee
6,904,560 B1    6/2005  Panda
(Continued)

OTHER PUBLICATIONS

A. Abdulkader, "Introducing DeepText: Facebook's text understanding engine | Engineering Blog | Facebook Code." https://code.facebook.com/posts/181565595577955/introducing-deeptext-facebooks-text-understanding-engine/ [Accessed Dec. 21, 2017].
(Continued)

*Primary Examiner* — Ashish Thomas
*Assistant Examiner* — Yohanes D Kelemework
(74) *Attorney, Agent, or Firm* — L. Jeffrey Kelly

(57) ABSTRACT

A method, system and computer program product for providing enhanced action fulfillment using classification valency. At least a first message from a user in a channel is analyzed, the first message containing first data of a first data type, and a classification of the first message is inferred based on the first data's content. At least a second message from the user in the channel is analyzed, the second message containing second data of a second data type different from the first data type, and a classification model of the second message is derived based on the second data's content. The classification of the first message and the classification model of the second message are used to determine whether an additional inference is available based on the classification valency. The additional inference is incorporated to determine the enhanced action fulfillment, and the enhanced action is presented to the user for fulfillment.

19 Claims, 5 Drawing Sheets

(51) Int. Cl.
  *H04W 4/12*    (2009.01)
  *H04L 67/306*  (2022.01)
  *H04L 67/12*   (2022.01)
  *G06N 20/00*   (2019.01)

(56) References Cited

U.S. PATENT DOCUMENTS

| | | | |
|---|---|---|---|
| 7,406,502 B1 | 7/2008 | Oliver et al. | |
| 8,000,911 B2 | 8/2011 | Carter | |
| 9,471,851 B1* | 10/2016 | Cao | G06K 9/00362 |
| 2007/0143298 A1 | 6/2007 | Surendran et al. | |
| 2011/0072052 A1 | 3/2011 | Skarin et al. | |
| 2013/0036117 A1 | 2/2013 | Fisher et al. | |
| 2013/0174058 A1 | 7/2013 | Kaul et al. | |
| 2013/0346347 A1 | 12/2013 | Patterson et al. | |
| 2014/0359480 A1 | 12/2014 | Vellal et al. | |
| 2017/0270416 A1* | 9/2017 | Sri | G06F 16/9535 |
| 2018/0083898 A1* | 3/2018 | Pham | H04L 51/02 |
| 2018/0210874 A1* | 7/2018 | Fuxman | G06F 40/35 |
| 2019/0034823 A1* | 1/2019 | Thapliyal | G06N 20/00 |
| 2019/0163816 A1* | 5/2019 | Francis | G06K 9/6278 |
| 2019/0179955 A1* | 6/2019 | Geyer | G06N 20/10 |

OTHER PUBLICATIONS

H. Dong, "Structural Analysis of Chat Messages for Topic Detection," Online Information Review, vol. 30 Issue: 5, pp. 496-516, 2006, https://doi.org/10.1108/14684520610706398.

S. Iyer, Apr. 26, 2016, "The eCommerce Industry's Most Advanced Product Classification" [Accessed Dec. 21, 2017] https://quadanalytix.com/data-analytics-engineering/ecommerce-most-advanced-product-classification/.

A. Kannan, "Improving Product Classification Using Images," 2011 IEEE 11th International Conference on Data Mining, Vancouver,BC, 2011, pp. 310-319.

H. Shatkay, "Integrating image data into biomedical text categorization." Bioinformatics vol. 22 No. 14 2006, pp. e446-e453.

P. Adams, "Topic Detection and Extraction in Chat," 2008 IEEE International Conference on Semantic Computing, Santa Clara, CA, 2008, pp. 581-588.

Wang et al., "Building text features for object image classification", http://dhoiem.cs.illinois.edu/publications/cvpr2009_wang_flickr.pdf, 2009, 8 pages.

* cited by examiner

ENHANCED ACTION FULFILLMENT USING CLASSIFICATION VALENCY

BACKGROUND

The present invention relates generally to a method and system for providing enhanced action fulfillment using classification valency.

One of the drawbacks with current action fulfillment methods is that actions are identified from a single text classification entity that is typically deployed to check each message as it arrives in a message queue. After receipt of each message, the text of the message is classified based on pre-defined training text, and an action is fulfilled based on that classification.

Another drawback is that too little text may be entered for inference. Yet another drawback is that classifiers can be under-trained. This can lead to poor classifier results for precision and recall, and ultimately customer dissatisfaction.

There is a need in the art, then, for systems and methods to remedy these problems. The present invention satisfies that need.

SUMMARY

The invention provided herein has a number of embodiments useful, for example, in implementing a method, system and computer program product for providing enhanced action fulfillment using classification valency. At least a first message from a user in a channel is analyzed, the first message containing first data of a first data type, and a classification of the first message is inferred based on the first data's content. At least a second message from the user in the channel is analyzed, the second message containing second data of a second data type different from the first data type, and a classification model of the second message is derived based on the second data's content. The classification of the first message and the classification model of the second message are used to determine whether an additional inference is available based on the classification valency. The additional inference is incorporated to determine the enhanced action fulfillment, and the enhanced action is presented to the user for fulfillment.

BRIEF DESCRIPTION OF THE DRAWINGS

Referring now to the drawings in which like reference numbers represent corresponding parts throughout.

DETAILED DESCRIPTION

Figure 1:
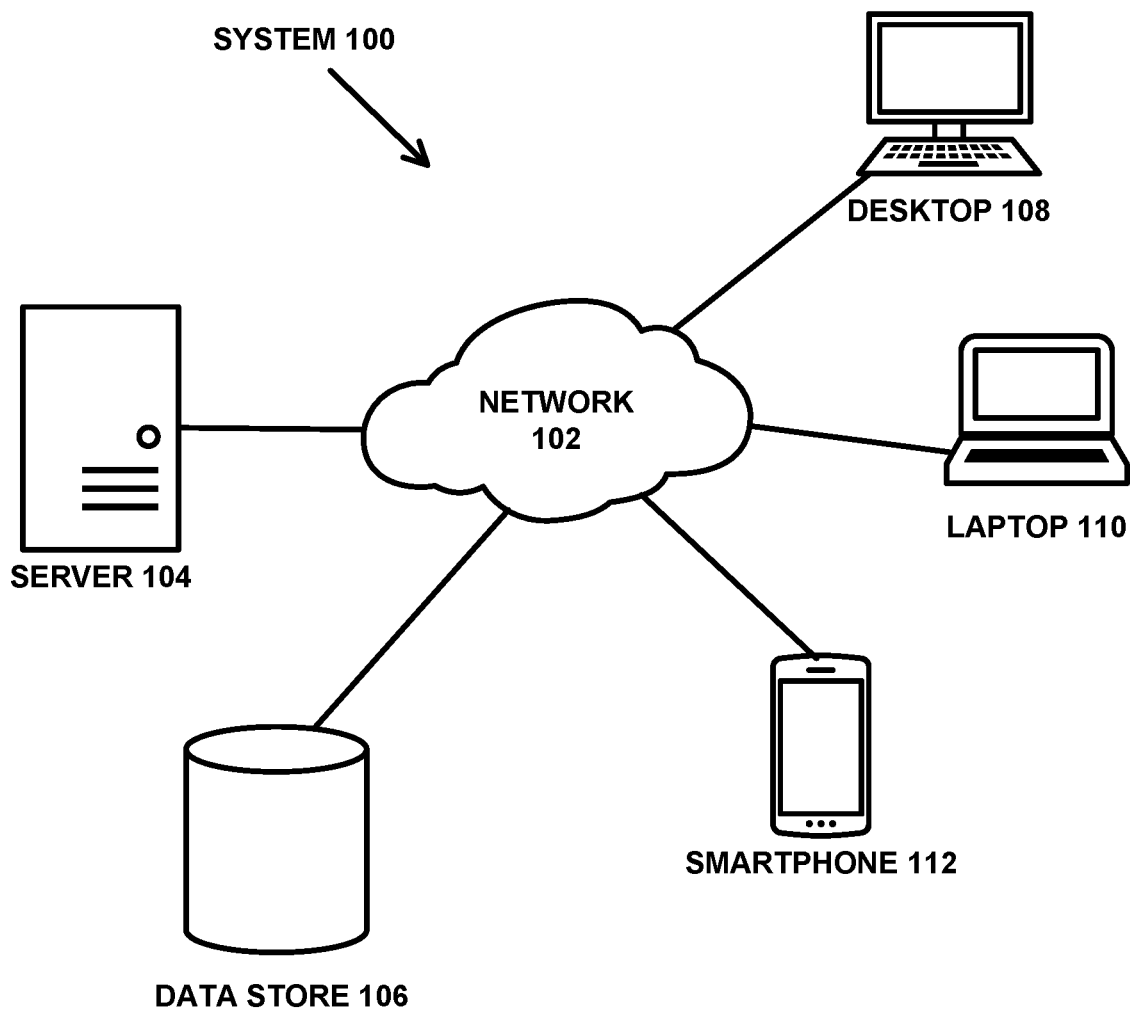
FIG. 1 is a pictorial representation of a system for providing enhanced action fulfillment using classification valency.

In the following description, reference is made to the accompanying drawings which form a part hereof, and in which is shown by way of illustration one or more specific embodiments in which the invention may be practiced. It is to be understood that other embodiments may be utilized and structural and functional changes may be made without departing from the scope of the present invention.

Overview

The present invention comprises a computer-implemented method and system for providing enhanced action fulfillment using classification valency. Classification valency refers to the strength of the association.

Specifically, the present invention examines additional data types, such as media data types, to aid in the classification of text for action fulfillment. The use of a novel classification model allows for additional contributions to be accepted from the additional data types to aid in the inference of the text classification, and the resulting action fulfillment. In this regard, the use of additional data types can enhance or weaken the association of text with a particular classification.

The precision and recall of action fulfillment outputs in a real-time collaboration context can vary depending on the domain, testing and training data. A lack of precision and recall can lead to erroneous results. Therefore, with these problems, the present invention provides a system and method for performing the following functions and steps:

- A message in a chat space or channel containing a data type, such as text, is analyzed and an initial classification is inferred based on the content of the text.
- A message in the chat space or channel containing one or more additional data types, such as media data types, is also analyzed and a classification model is derived based on the content of the media data.
- Using the results from the classification of the text and the classification model of the media data, an arbitration service determines whether an additional inference can be used based on the distance of the classification model of the media data from the classification of the text.
- The system incorporates the additional inference to determine an enhanced action fulfillment classification, wherein the enhanced action is presented to the user for fulfillment.

Current systems and methods fall short in providing additional levels of classification to enhance results for action fulfillment. While text and media data classifications are known, current systems and methods do not perform an analysis to infer the relative contribution of the media data to enhance classifications for the text. Moreover, current systems and methods do not allow a weighted level of additional contributions to enhance classification outcomes.

Note that these functions and steps may include the following additional elements:

- Through the classifications, customized profiles can be created for individuals or domains that would tie into the additional data types that have been shared before or are already on the user's device. Whenever messages refer to the individuals or domains, suggestions would appear to aid the conversation by presenting relevant material without having the need to search for it.
- Action fulfillment classifications can be enhanced by analyzing historical completions of previous classifications (whether users actually performed the presented action or not), resulting in an implicit feedback loop that results in improvements to the classifications.

Hardware and Software Environment

FIG. 1 is a pictorial representation of a system 100 for providing enhanced action fulfillment using classification valency, according to one embodiment.

The system 100 includes a network 102, which is the medium used to provide communications links between various devices and computers connected together within the system 100. In the depicted example, the network 102 may be the Internet or another network.

One or more server computers 104 are connected to the network 102, along with one or more data stores 106. In addition, one or more client devices 108, 110, 112 are connected to the server computers 104 and data stores 106 via the network 102. These client devices 108, 110, 112 may be, for example, desktop computers 108, laptop or notebook computers 110, smartphones 112 and other devices.

The server computers 104, data stores 106, and client devices 108, 110, 112, are typically comprised of one or more processors, random access memory (RAM), read-only memory (ROM), and other components such data storage devices and data communications devices. Moreover, the server computers 104, data stores 106, and client devices 108, 110, 112, execute one or more computer programs operating under the control of an operating system. At least some of these computer programs perform various functions and steps as described in more detail below.

Enhanced Action Fulfillment Using Classification Valency

Figure 2:
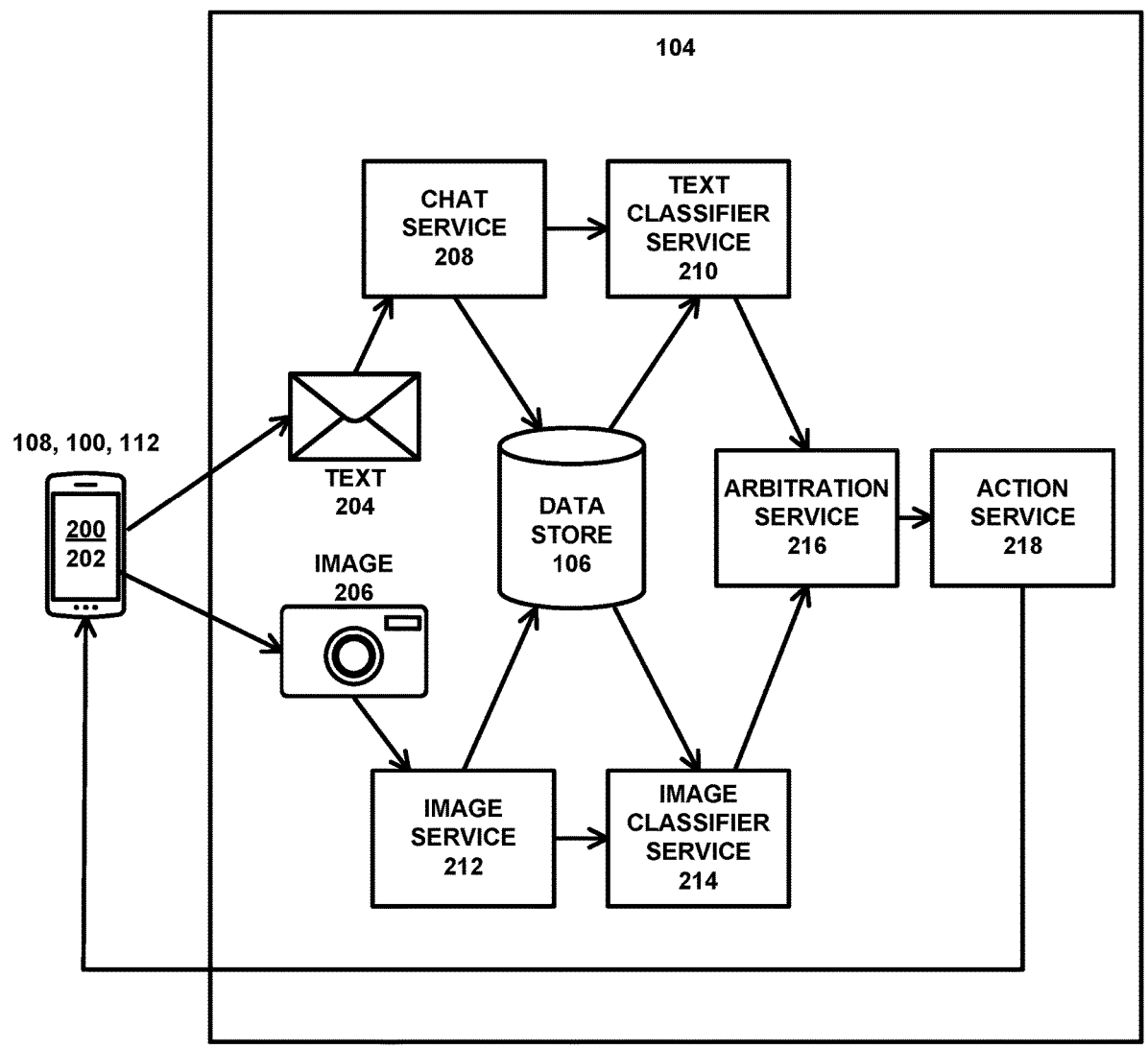
FIG. 2 is a block diagram illustrating how method and system for providing enhanced action fulfillment using classification valency is implemented by the system, according to one embodiment.

FIG. 2 is a block diagram illustrating how providing enhanced action fulfillment using classification valency is implemented by the system 100, according to one embodiment. In this embodiment, the system 100 is implemented using:

a browser 200 or agent 202 executed on a user's client devices 108, 110, 112 that exchanges messages 204, 206 with other users' client devices 108, 110, 112, via a chat space or channel provided by the server computers 104; and a plurality of modules 208-218 executed on the server computers 104 that analyze the messages 204, 206 in order to infer classifications based on the content of the messages 204, 206, which are arbitrated to determine an enhanced action for fulfillment by the user.

In alternative embodiments, these functions and steps may be wholly or partially performed on the server computers 104 and/or client devices 108, 110, 112.

In one embodiment, the server computers 104 and the data stores 106 together provide the functionality associated with the Watson™ services offered by International Business Machines, the assignee of the present invention. However, the invention could easily apply to other real-time chat room offerings that support a micro-service architecture, such as those offered by Microsoft™ Teams, Slack™, etc.

The server computers 104, data stores 106, and client devices 108, 110, 112, are used to perform the following steps and functions:

The browser 200 and/or agent 202 executed on the client devices 108, 110, 112 participates in a chat space or other channel for exchanging information, and generates one or more text messages 204, as well as one or more image messages 206. These messages 204, 206 are then transmitted from the user's devices 108, 110, 112 to the server computers 104.

A chat service 208 executed by the server computers 104 receives the text message 204, optionally saves the text messages 204 to the data stores 106 for later retrieval, and passes the text messages 204 to a text classifier service 210. The text classifier service 210 analyzes the text messages 204 and a classification is made based on the content of the text message 204. For example, the classification may indicate that the text message 204 is an action request.

An image service 212 executed by the server computers 104 receives the image message 206, optionally saves the image messages 206 to the data stores 106 for later retrieval, and passes the image messages 206 to an image classifier service 214. The image classifier service 214 analyzes the image messages 206 and a classification model is derived based on the content of the image message 206. For example, the classification model may indicate that the image message 206 is an item referenced in the text message 204.

Using the results from the classification of the text message 204 and the classification model for the image message 206, an arbitration service 216 infers additional classification information based on the distance of the classification model for the image message 206 from the classification of the text message 204. For example, the arbitration service 216 may infer that the text message 204 and the image message 206 are related using precision, recall and F1 scores.

For the arbitration service 216, the precision for a classification made by a classifier 210, 216 is the number of true positives (i.e. the number of messages correctly labeled as belonging to the classification) divided by the total number of messages labeled as belonging to the classification (i.e., the sum of true positives and false positives, which are messages incorrectly labeled as belonging to the classification).

Recall in this context is defined as the number of true positives divided by the total number of messages that actually belong to the classification (i.e., the sum of true positives and false negatives, which are messages which were not labeled as belonging to the classification but should have been).

A perfect precision score of 1.0 means that every message assigned to the classification was relevant (but says nothing about whether all relevant messages were assigned), whereas a perfect recall score of 1.0 means that all relevant messages were assigned to the classification search (but says nothing about how many irrelevant messages were also assigned).

An F1 score is a combination of precision and recall, namely, the weighted harmonic mean of precision and recall. The F1 score is a measure of accuracy, wherein an F1 score reaches its best value at 1 (perfect precision and recall) and worst at 0.

Incorporating the additional classification information from the arbitration service 216 with the classification of the text message 204 and the classification model for the image message 206, the action service 218 generates an enhanced action that is then presented to the client devices 108, 110, 112 for fulfillment by the user. For example, the enhanced action may comprise a query "Do you want someone to take a look at the data you provided?" that is displayed on the client device 108, 110, 112 for the end user to fulfill by answering with a "Yes" or "No" response.

Use Case

Consider the following use case where the system 100 is used for providing enhanced action fulfillment using classification valency.

In this example, a service engineer (Steve) is working to repair a gas burner at a remote customer location. The service engineer communicates via messages in a chat space (i.e., an interactive chat system) with a dispatcher (Sarah) who assigned the repair task to the service engineer. The chat space is hosted and monitored by the server computers 104, and the service engineer and dispatcher communicate via the chat space using client devices 108, 110, 112.

When using the chat space, the service engineer and dispatcher carry on a conversation about servicing the gas burner at the remote customer location using text messages 204. During the conversation, the service engineer sends an image message 206 to the server computers 104 that uploads an image of the gas burner being serviced into the chat space. The server computers 104 identify the model of the gas burner from the image message 206 and send a message to the service engineer asking if the image message 206 is related to the conversation in the previous text messages 204. This can be done automatically and the message asks the service engineer to confirm. This data would then be used, along with the content of the other messages in the chat space, to suggest an enhanced action to be fulfilled by the service engineer.

An exemplary transcript of the messages 204, 206 in the chat space is provided below, with the classifications generated by the server computers 104 shown in parentheses:

Chat Space/Channel Name: "Repair Gas Burner at 4 Adelaide Road, London."

Sarah: Hi Steve, you have been assigned this job today at 3 pm at the address shown in the chat space. (ACTION+LOCATION)

Sarah: The gas burner is 6 years old and is model Y series 7600. It was previously serviced by Bob 12 months ago. (ISSUE DETAIL)

Steve: Thanks, Sarah. I am at the location with the customer. (ACTION COMPLETION)

Steve: <Image message: Gas burner>

Steve: There is a low-pressure issue and the pilot is not working. (ISSUE)

Sarah: OK. Fixable. An hour? (QUESTION)

Steve: About that, yes. (ANSWER)

Server computers 104: Hi Steve, is the image message you uploaded, which I recognize as a gas burner, related to the low pressure issue and the pilot light not working? (ACTION FULFILLMENT: QUESTION)

Steve: Yes, is it related. (ANSWER TO ACTION FULFILLMENT)

Server computers 104: Would you like to put these items into the issue number related to this issue? (ACTION FULFILLMENT: QUESTION)

Steve: Yes. (ANSWER TO ACTION FULFILLMENT)

During this exchange of messages 204, 206 in the chat space, the messages 204, 206 are analyzed by the server computers 104. The classifications generated by the text classifier service 210 are analyzed during the exchange to determine how good are the classifications, and whether better classifications are available.

Specifically, the image message 206 within the threaded conversation is analyzed by the image classifier service 214, and the arbitration service 216 determines whether the classifications of the image messages 206 are similar to the classifications of the text messages 204. It is anticipated that the arbitration service 216, by combining the outputs of the text classifier service 210 and the image classifier service 214, can derive a higher degree of precision for the actions service 218, there by resulting in enhanced action fulfillment.

Flowchart

Figure 3:
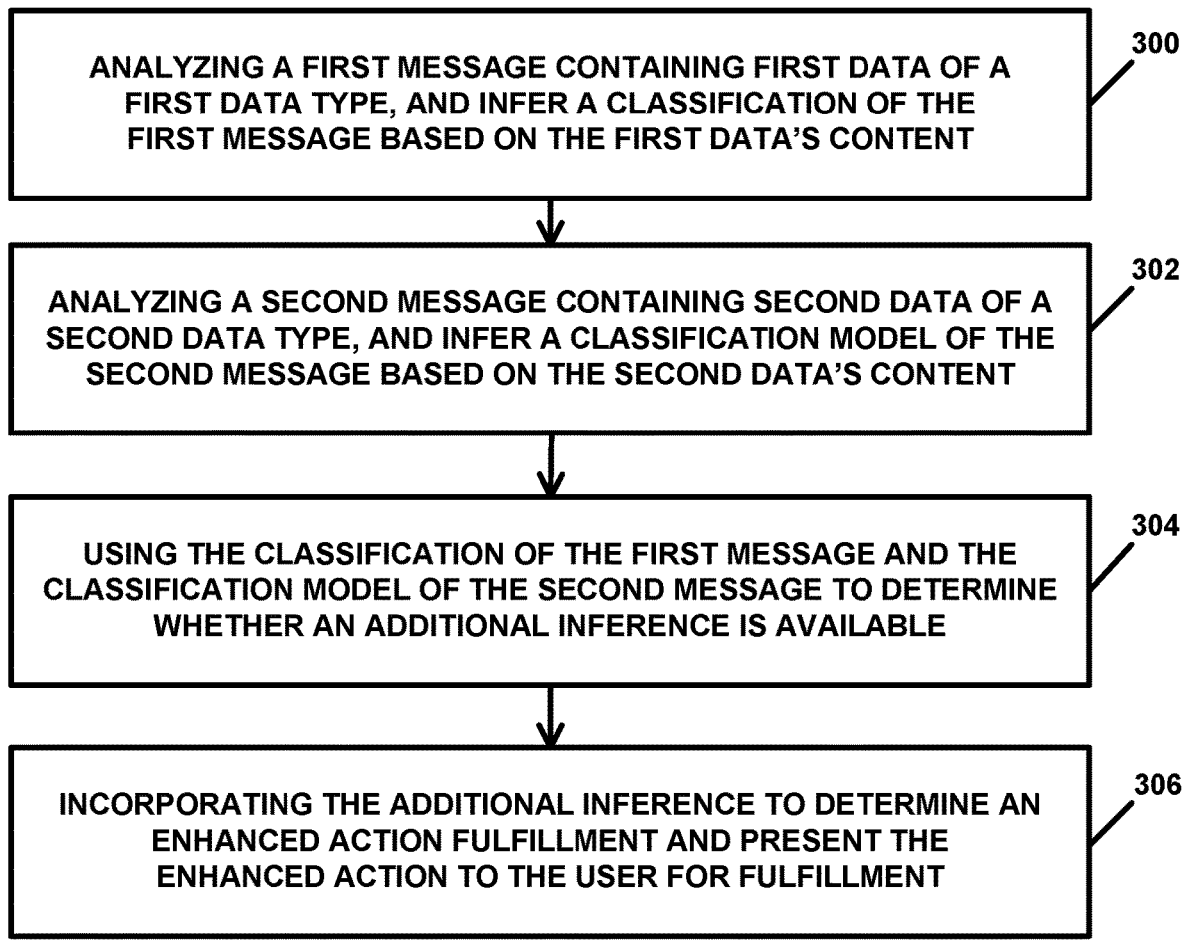
FIG. 3 is a flowchart illustrating the steps performed by the system when implementing the computer-implemented method of this invention, according to one embodiment.

FIG. 3 is a flowchart illustrating the steps performed by the system 100 when implementing the computer-implemented method of this invention, according to one embodiment. Specifically, these steps comprise the system 100 providing enhanced action fulfillment using classification valency.

Block 300 represents the system 100 analyzing at least a first message from a user in a channel, the first message containing first data of a first data type, and inferring a classification of the first message based on the first data's content. In one embodiment, the channel is a chat space, and the first data comprises text.

Block 302 represents the system 100 analyzing at least a second message from the user in the channel, the second message containing second data of a second data type different from the first data type, and deriving a classification model of the second message based on the second data's content. In one embodiment, the second data comprises one or more images, audio or video.

Block 304 represents the system 100 using the classification of the first message and the classification model of the second message, to determine whether an additional inference is available based on the classification valency, wherein the classification valency comprises a distance of the classification model of the second data from the classification of the first data. In one embodiment, the second data enhances or weakens an association of the first data with the classification, and the classification model of the second data may be weighted to enhance or weaken the association of the first data with the classification. In one embodiment, the additional inference determines whether the first message and the second message are related using precision, recall and a weighted harmonic mean of precision and recall.

Block 306 represents the system 100 incorporating the additional inference to determine the enhanced action fulfillment, and presenting the enhanced action to the user for fulfillment.

The system 100 may also create a profile based on the classification valency and present relevant material into the channel based on the profile. In addition, the system 100 may analyze fulfilments of previous actions, resulting in a feedback loop that improves the classification or the classification model.

Alternatives and Modifications

As noted above, classification of text messages may be performed in conjunction with messages containing additional data types, such as images, audio and video. However, these additional data types are not limited to media data, such as images, audio and video, and may comprise still other data types.

As noted above, an additional inference may be used based on the distance of the classification model of the additional data types from the classification of the text. However, in other embodiments, the additional inference may be based on other comparisons of the classification model of the additional data types and the classification of the text.

Statutory Subject Matter

It can be seen that the present invention provides a number of benefits and advantages. These benefits and advantages include improvements to the technology or technical field of classifying messages in a channel, and more specifically, for providing enhanced action fulfillment using classification valency. These benefits and advantages also include improvements to the functioning of the computers themselves, as compared to prior computer-implemented methods and systems for classifying messages and for action fulfillment using those classifications.

With regard to improvements to the technology or technical field, the computer-implemented method and system for providing enhanced action fulfillment using classification valency provides these improvements by using the classification of the first message and the classification model of the second message, to determine whether an additional inference is available based on the classification valency, and then incorporating the additional inference to determine the enhanced actions for fulfillment, Both generally and specifically, these steps and functions of the computer-implemented method and system comprise specific improvements other than what is well-understood, routine and conventional in the field. Moreover, these steps and functions of the computer-implemented method and system add unconventional steps to a particular useful application.

The result is improved performance with regards to the classification of the messages in the channel, along with more accurate action fulfillment resulting from that classification. Users and administrators are able to rely on the system 100 more accurately performing the classification of messages, as well as more accurately generating the enhanced actions for fulfillment.

Cloud Computing

It is to be understood that this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
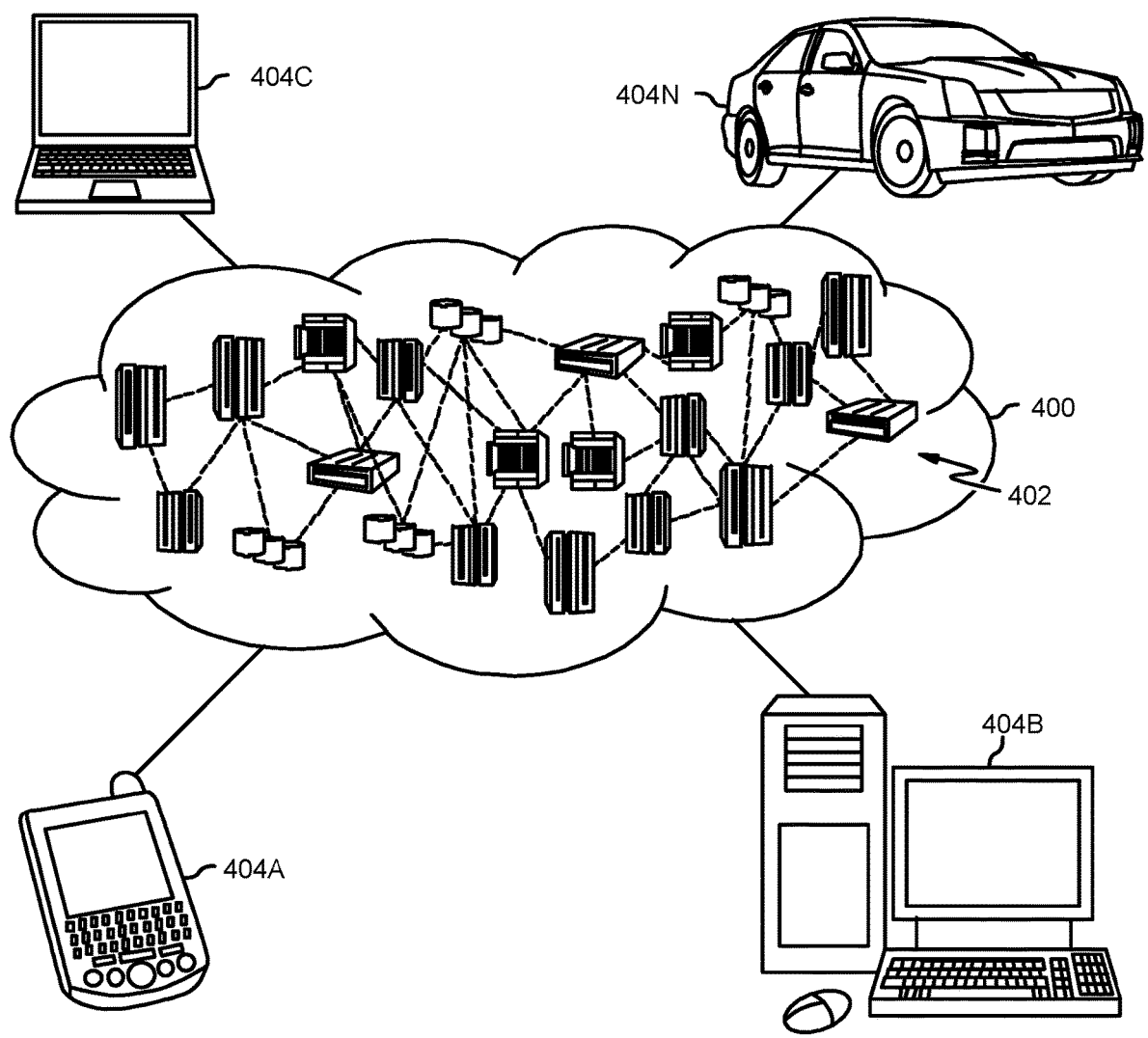
FIG. 4 illustrates a cloud computing environment that may be used to implement the computer-implemented method of this invention, according to one embodiment.

Referring now to FIG. 4, illustrative cloud computing environment 300 is depicted. As shown, cloud computing environment 400 includes one or more cloud computing nodes 402 with which local computing devices used by cloud consumers, such as, for example, personal digital assistant (PDA) or cellular telephone 404A, desktop computer 404B, laptop computer 404C, and/or automobile computer system 404N may communicate. Nodes 402 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 404A-N shown in FIG. 4 are intended to be illustrative only and that computing nodes 402 and cloud computing environment 400 can communicate with any type of computerized device over any type of network and/or network addressable connection (e.g., using a web browser).

Figure 5:
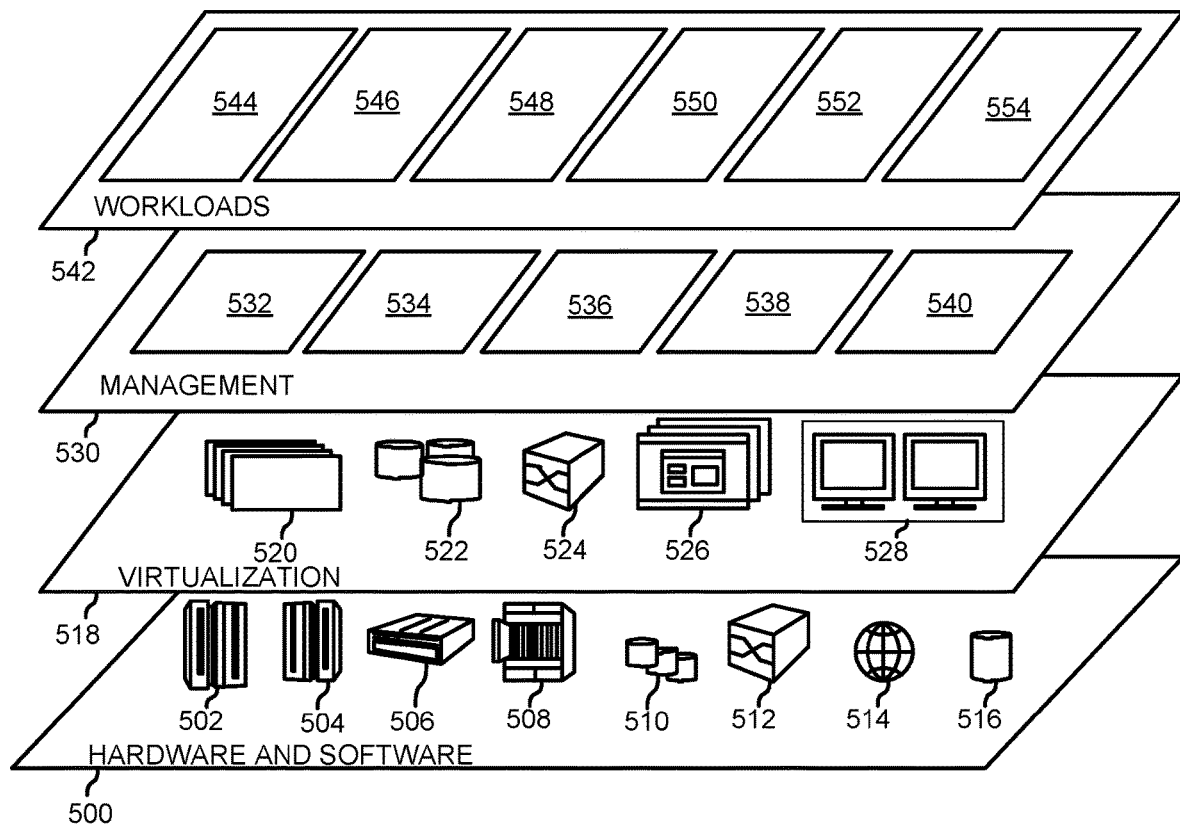
FIG. 5 illustrates a set of functional abstraction layers provided by the cloud computing environment, according to one embodiment.

Referring now to FIG. 5, a set of functional abstraction layers provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 500 includes hardware and software components. Examples of hardware components include: one or more computers such as mainframes 502; RISC (Reduced Instruction Set Computer) architecture based servers 504; servers 506; and blade servers 508; storage devices 510; and networks and networking components 512. In some embodiments, software components include network application server software 514 and database software 516.

Virtualization layer 518 provides an abstraction layer from which the following examples of virtual entities may be provided: virtual servers 520; virtual storage 522; virtual networks 524, including virtual private networks; virtual applications and operating systems 526; and virtual clients 528.

In one example, management layer 530 may provide the functions described above. Resource provisioning 532 provides dynamic procurement of computing resources and other resources that are utilized to perform tasks within the cloud computing environment 400. Metering and pricing 534 provide cost tracking as resources are utilized within the cloud computing environment 400, and billing or invoicing for consumption of these resources. In one example, these resources may include application software licenses. Security provides identity verification for cloud consumers and tasks, as well as protection for data and other resources. User portal 536 provides access to the cloud computing environment 400 for consumers and system administrators. Service level management 538, which includes containers, provides cloud computing resource allocation and management such that required service levels are met. Service Level Agreement (SLA) planning and fulfillment 540 provide pre-arrangement for, and procurement of, cloud computing resources for which a future requirement is anticipated in accordance with an SLA.

Workloads layer 542 provides examples of functionality for which the cloud computing environment 400 may be utilized. Examples of workloads, tasks and functions which may be provided from this layer include: mapping and navigation 544; software development and lifecycle management 546; virtual classroom education delivery 548; data analytics processing 550; transaction processing 552; etc. More specifically, this layer includes the workloads, tasks and functions for providing enhanced action fulfillment using classification valency 554 described above.

Computer Program Product

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart illustrations and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart illustrations and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart illustrations and/or block diagram block or blocks.

The flowchart illustrations and block diagrams in the Figures illustrate the architecture, functionality, and operation of possible implementations of systems, methods, and computer program products according to various embodiments of the present invention. In this regard, each block in the flowchart illustrations or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

CONCLUSION

This concludes the description of the various embodiments of the present invention. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Since many embodiments of the invention can be made without departing from the spirit and scope of the invention, the invention resides in the claims hereinafter appended.

What is claimed is:

1. A computer-implemented method, comprising:
providing enhanced action fulfillment using classification valency, by:
analyzing at least a first message from a user in a channel, the first message comprises only text data of a first data type;
classifying the first message based on the text data;
analyzing at least a second message from the user in the channel, the second message comprises only image data;
deriving a classification model of the second message based on the image data;
comparing the classification of the first message with the classification model of the second message to determine a distance between the classification of the first message and the classification model of the second message;
inferring the first message is related to the second message based on the determined distance using a precision score, a recall score and an F1 score,
wherein the precision score is a number of true positives of messages correctly labeled as belonging to the classification of the first message divided by a total number of messages labeled as belonging to the classification of the first message,
wherein the recall score is the number of true positives divided by a total number of messages which actually belong to the classification of the first message,
wherein the F1 score is a weighted harmonic mean of the precision score and the recall score;
increasing an association of the first message and the second message based on the inference that the first message and the second message are related;
decreasing an association of the first message and the second message based on the inference that the first message and the second message are not related;
generating an enhanced action fulfillment based on the classification of the first message, the classification model of the second message, the distance between the classification of the first message and the classification model of the second message, and the adjusted association of the text data of the first message with the classification of the first message based on the image data of the second message; and
presenting the enhanced action to the user for fulfillment.

2. The method of claim 1, wherein the channel is a chat space.

3. The method of claim 1, wherein the first message further comprises image data, audio data, and video data.

4. The method of claim 1, wherein the second message further comprises audio data and video data.

5. The method of claim 1, wherein adjusting the association of the text data of the first message with the classification of the first message based on the image data of the second message comprises:
applying a weight to the classification model of the second data.

6. The method of claim 1, wherein comparing the classification of the first message with the classification model of the second message further comprises:
determining the first message and the second message are related using precision and recall.

7. The method of claim 6, wherein comparing the classification of the first message with the classification model of the second message further comprises:
determining the first message and the second message are related using a weighted harmonic mean of the precision and recall.

8. The method of claim 1, further comprising:
creating a profile based on the classification valency and presenting relevant material into the channel based on the profile.

9. The method of claim 1, further comprising:
analyzing fulfilments of previous actions, resulting in a feedback loop used for improving the classification and the classification model.

10. A computer-implemented system for providing enhanced action fulfillment using classification valency, the computer-implemented system comprising:
one or more computers programmed for providing enhanced action fulfillment using classification valency, by:
one or more computer processors, one or more computer-readable storage media, and program instructions stored on the one or more of the computer-readable storage media for execution by at least one of the one or more processors, wherein the computer system is capable of performing a method comprising:
analyzing at least a first message from a user in a channel, the first message comprises only text data of a first data type;
classifying the first message based on the text data into a first classification;
analyzing at least a second message from the user in the channel, the second message comprises only image data;
deriving a classification model of the second message based on the image data;
comparing the classification of the first message with the classification model of the second message to determine a distance between the classification of the first message and the first classification model of the second message;
inferring the first message is related to the second message based on the determined distance using a precision score, a recall score and an F1 score,
wherein the precision score is a number of true positives of messages correctly labeled as belonging to the classification of the first message divided by a total number of messages labeled as belonging to the classification of the first message,
wherein the recall score is the number of true positives divided by a total number of messages which actually belong to the classification of the first message,
wherein the F1 score is a weighted harmonic mean of the precision score and the recall score;
increasing an association of the first message and the second message based on the inference that the first message and the second message are related;
decreasing an association of the first message and the second message based on the inference that the first message and the second message are not related;
generating an enhanced action fulfillment based on the classification of the first message, the classification model of the second message, the distance between the classification of the first message and the classification model of the second message, and the adjusted association of the test text data of the first message with the classification of the first message based on the image data of the second message; and
presenting the enhanced action to the user for fulfillment.

11. The system of claim 10, wherein the channel is a chat space.

12. The system of claim 10, wherein the first message further comprises image data, audio data, and video data.

13. The system of claim 10, wherein the second message further comprises audio data and video data.

14. The system of claim 10, wherein adjusting the association of the text data of the first message with the classification of the first message based on the image data of the second message comprises:
applying a weight to the classification model of the second data.

15. The system of claim 10, wherein comparing the classification of the first message with the classification model of the second message further comprises:
determining the first message and the second message are related using precision and recall.

16. The system of claim 15, wherein comparing the classification of the first message with the classification model of the second message further comprises:
determining the first message and the second message are related using a weighted harmonic mean of the precision and recall.

17. The system of claim 10, further comprising:
creating a profile based on the classification valency and presenting relevant material into the channel based on the profile.

18. The system of claim 10, further comprising:
analyzing fulfilments of previous actions, resulting in a feedback loop used for improving the classification and the classification model.

19. A computer program product for providing enhanced action fulfillment using classification valency, the computer program product comprising:
one or more computer-readable storage media and program instructions stored on the one or more computer-readable storage media, the program instructions executable by a computing system to cause the computing system to perform a method comprising:
analyzing at least a first message from a user in a channel, the first message comprises only text data of a first data type;
classifying the first message based on the text data;
analyzing at least a second message from the user in the channel, the second message comprises only image data;
deriving a classification model of the second message based on the image data;
comparing the classification of the first message with the classification model of the second message to determine a distance between the classification of the first message and the classification model of the second message, inferring the first message is related to the second message based on the determined distance using a precision score, a recall score and an F1 score, wherein the precision score is a number of true positives of messages correctly labeled as belonging to the classification of the first message divided by a total number of messages labeled as belonging to the classification of the first message, wherein the recall score is the number of true positives divided by a total number of messages which actually belong to the classification of the first message, wherein the F1 score is a weighted harmonic mean of the precision score and the recall score;

increasing an association of the first message and the second message based on the inference that the first message and the second message are related;

decreasing an association of the first message and the second message based on the inference that the first message and the second message are not related;

generating an enhanced action fulfillment based on the classification of the first message, the classification model of the second message, the distance between the classification of the first message and the classification model of the second message, and the adjusted association of the text data of the first message with the classification of the first message based on the image data of the second message; and presenting the enhanced action to the user for fulfillment.

* * * * *